United States Patent [19]

Luebke

[11] 4,414,961
[45] Nov. 15, 1983

[54] SOLAR ENERGY COLLECTING PANEL AND APPARATUS

[76] Inventor: Robert W. Luebke, 522 Ponte Vedra Blvd., Ponte Vedra, Fla. 32082

[21] Appl. No.: 235,741

[22] Filed: Feb. 18, 1981

[51] Int. Cl.³ .............................................. F24J 3/02
[52] U.S. Cl. .................................. 126/432; 126/444; 126/449; 165/104.26
[58] Field of Search ................ 126/432, 444, 449; 165/104.26

[56] References Cited

U.S. PATENT DOCUMENTS

| | | | |
|---|---|---|---|
| 3,215,134 | 11/1965 | Thomason | 126/271 |
| 3,991,742 | 11/1976 | Gerber | 126/271 |
| 4,129,117 | 12/1978 | Harvey | 237/1 A |
| 4,175,542 | 11/1979 | Duchene | 126/449 |
| 4,186,721 | 2/1980 | Whitman | 126/430 |
| 4,237,863 | 12/1980 | Harrison | 126/449 |
| 4,243,021 | 1/1981 | Homsy et al. | 126/449 |
| 4,256,092 | 3/1981 | Gutermuth et al. | 126/432 |
| 4,324,231 | 4/1982 | Reinert | 126/449 |
| 4,326,504 | 4/1982 | Guadard et al. | 126/432 |

*Primary Examiner*—Ronald C. Capossela
*Attorney, Agent, or Firm*—Burns, Doane, Swecker & Mathis

[57] ABSTRACT

The present invention relates to a solar energy collecting panel and an apparatus for utilizing of the panel. The collecting panel comprises a first layer of heat absorbing material. A fiber mat for repeatedly transporting fluid by both surface tension and capillary action to a first surface of the heat absorbing layer is arranged to intimately contact the first surface. A second layer is arranged such that the fiber mat is confined between the first and second layers. In a preferred embodiment, the fiber mat comprises a nonwoven, needle punched fabric of continuous filaments of polyester or polypropylene. The apparatus for use of the panel according to the present invention includes an inlet and an outlet header sealed to first and second ends of the collecting panel. Fluid to be heated is delivered to the inlet header and the fiber mat transports the fluid by capillary action and surface tension along the filaments of the fiber mat to repeatedly intimately contact the surface of the heat absorbing layer to absorb heat therefrom and transports the fluid to the outlet header. The heated fluid in the outlet header is removed and utilized in a conventional heating or hot water system.

17 Claims, 5 Drawing Figures

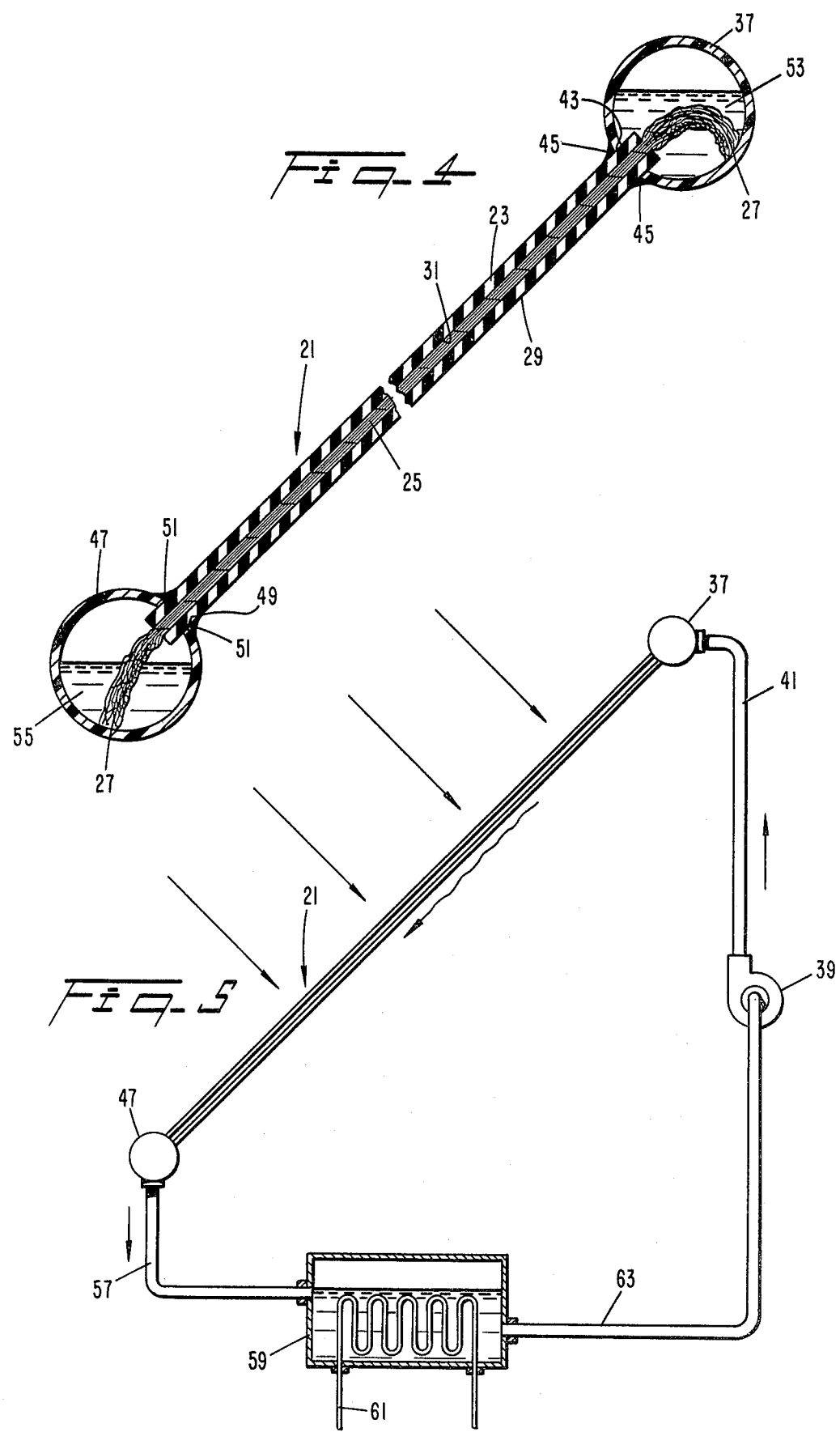

SOLAR ENERGY COLLECTING PANEL AND APPARATUS

BACKGROUND AND SUMMARY OF THE PRESENT INVENTION

The present invention relates to a solar energy collecting panel and an apparatus for utilizing the solar energy collecting panel.

Various apparatus have been proposed for collecting heat energy from the sun. Many of these apparatus comprise heavy rigid boxes which are sealed from the outside and use the "greenhouse" effect to heat water passing through finned tubes and the like within the box. Other collectors focus sunlight on blackened or heat absorbing tubes to more efficiently heat the water therein.

A further solar collecting panel, for example, of the type disclosed in U.S. Pat. No. 3,991,742 issued Nov. 16, 1976 to Gerber, includes a lower layer and an upper heat absorbing layer with a spreader or separation member located therebetween. The spreader is provided to maintain separation between the two layers and to break up small rivulets of water to establish a thin sheet of water covering the entire surface of the panel layers. The separator may be fiberglas screening, plastic netting, open weave cloth, or open cell polyurethane foam plastic. The moving force on the water is primarily gravity and the input water is controlled to obtain an even flow rate through the entire panel. Another device of this general type for spreading water over the entire heat collecting surface is disclosed in U.S. Pat. No. 3,215,134 issued Nov. 2, 1965 to Thomason and includes a corrugated sheet to evenly distribute the water flowing along the sheet.

Other solar energy collecting devices have been proposed that utilize a fabric element which is directly heated by the sun. Water is then allowed to flow over the heated fabric to remove heat therefrom. Devices of this type generally required a bulky support frame and rely primarily on gravity to drive the water over the fabric element. Devices of this general type are disclosed in U.S. Pat. Nos. 4,129,117 issued Dec. 12, 1978 to Harvey; 4,175,542 issued Nov. 27, 1979 to Duchene; and 4,186,721 issued Feb. 5, 1980 to Whitman.

It will be appreciated that collectors of these types are generally expensive to produce and difficult to install. Further, heat transfer to the fluid is limited by the number of tubes that can be installed within the limited area of the box and still be exposed to sufficient sunlight.

It is therefore an object of the present invention to provide a lightweight highly efficient solar collecting panel which is simple in construction and easy to install.

A further object of the present invention is to provide a solar collecting panel which employs fibers for transporting fluid against a heat collecting surface by capillary action and surface tension. A collecting panel according to the present invention has the further object of establishing a controlled flow rate for the fluid through the fibers which flow rate is not dependent upon gravity as the sole driving force and does not require regulation of the input flow to the solar collecting panel.

Still a further object of the present invention is to provide a solar collecting apparatus that utilizes the solar collecting panel of the present invention.

These and other objects of the present invention are achieved by a solar energy collecting panel including a first layer comprised of heat absorbing material. Fibers are provided for repeatedly transporting fluid by capillary action toward a first surface of the heat absorbing layer to transfer heat from layer to the fluid. The fibers are arranged to intimately contact the first surface and are held in intimate contacting relationship with the first surface by a second layer arranged beneath the fibers.

According to a preferred embodiment of the present invention, the fibers are a nonwoven needle punched fabric comprised of continuous filaments of polyester or polypropylene. Further, according to the preferred embodiment, the heat absorbing layer comprises a flexible film of rubber which is bonded to the fabric. The second layer is preferably comprised of heat reflective material in order to maintain the heat absorbed within the fabric at a maximum.

A solar energy collecting apparatus according to the present invention includes an inlet header and an outlet header and means for supplying fluid to be heated to the inlet header. A first layer of heat absorbing material has a first end sealed to the inlet header and a second end sealed to the outlet header. Fibers for repeatedly transporting fluid toward a first surface of the heat absorbing layer and for transporting fluid from the inlet header to the outlet header are arranged between the first layer and a second layer which has first and second ends sealed to the inlet and outlet headers respectively. The fibers are arranged to intimately contact the first surface and extend beyond ends of the first and second layers into the interior of the inlet and outlet headers.

According to a further feature of the present invention, the longitudinal edges of the first and second layers are bonded together to ensure that fluid cannot leak from the longitudinal edges.

BRIEF DESCRIPTION OF THE DRAWINGS

Preferred embodiments of the present invention will be described in greater detail with reference to the attached drawings wherein like members bear like reference numerals and wherein:

FIG. 4 is a cross-sectional view of a portion of a solar collecting apparatus according to the present invention utilizing the solar energy collecting panel of the present invention;

FIG. 5 is a schematic view of a solar energy collecting apparatus according to the present invention.

DETAILED DESCRIPTION OF THE PREFERRED EMBODIMENTS

Figure 1:
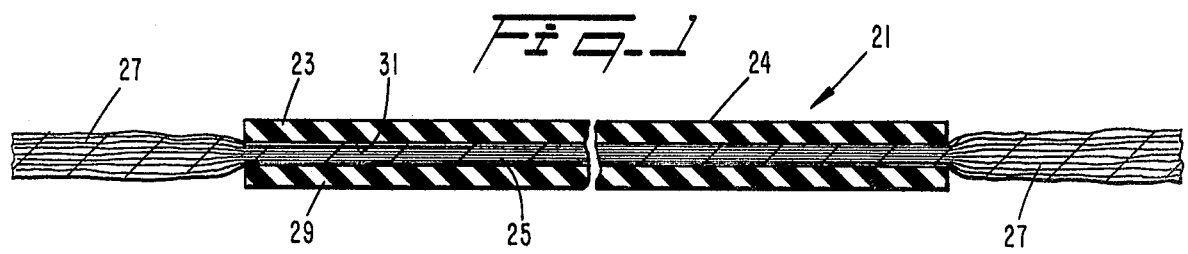
FIG. 1 is a longitudinal cross-sectional view of a solar energy collecting panel according to the present invention.
Figure 3:
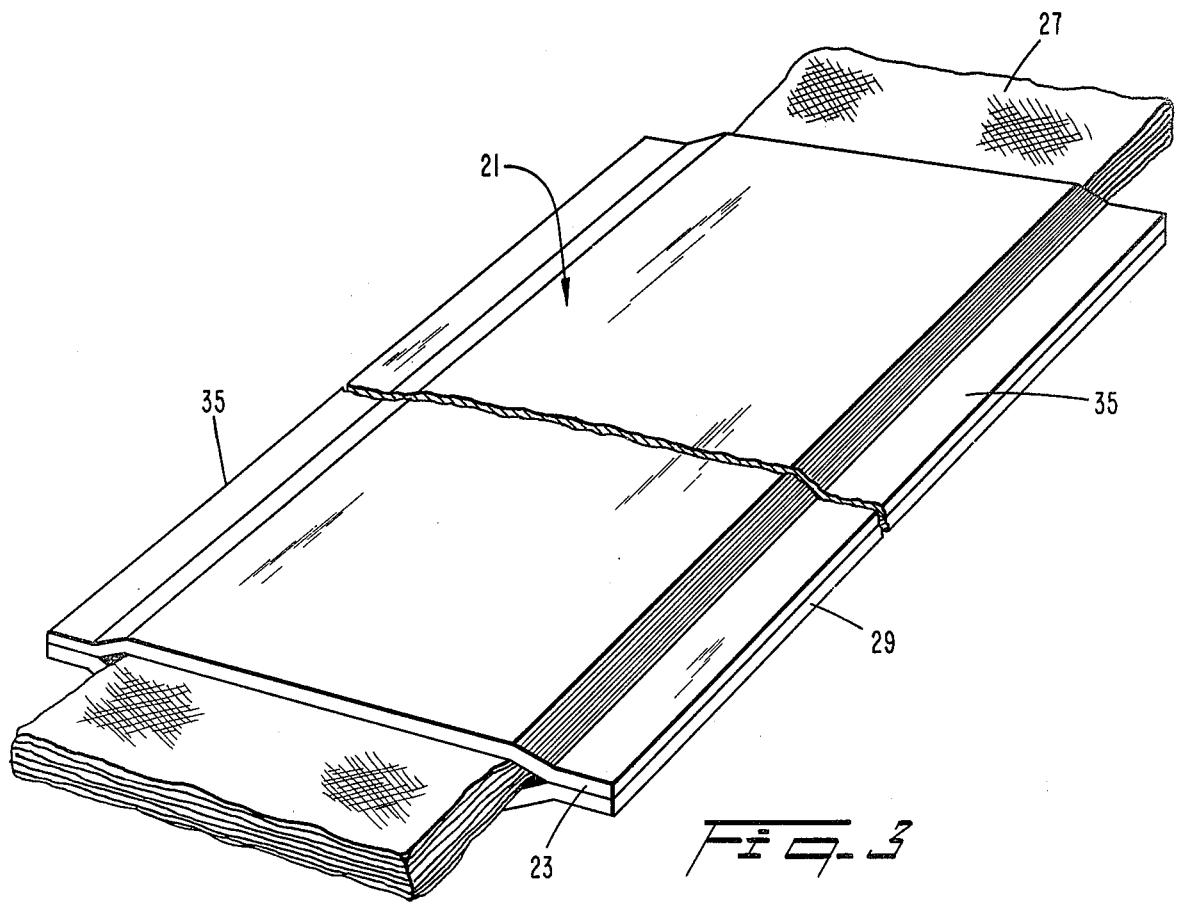
FIG. 3 is a perspective view of a solar energy collecting panel according to the present invention.

With reference to FIG. 1, a solar energy collecting panel 21 includes an upper layer 23 with an upper surface 24 adapted to be exposed to the sun. The upper layer 23 is comprised of a suitable heat absorbing material. In the preferred embodiment, the upper layer 23 comprises a film of rubber or suitable plastic material which is relatively flexible. It is also preferred that the first layer is black to increase the heat absorbing ability of the layer 23. Arranged directly beneath the upper layer 23 is a fiber mat 25 that contacts a lower surface 31 of the first layer 23 over substantially the entire area of the surface 31. The ends 27 of the fiber mat 25 extend beyond the ends of the upper layer 23 (as also seen in FIG. 3). In the preferred embodiment, the upper layer 23 of rubber is bonded directly to the fiber mat 25 by heat and pressure curing of the rubber for reasons to be explained below.

Arranged beneath the fiber mat 25 is a second, lower layer 29 which aids in maintaining the fiber mat 25 closely adjacent to a lower surface 31 of the upper layer 23 and also serves to seal a lower surface of the fiber mat 25 from the outside environment. The lower layer 29 is substantially the same size and shape as the upper layer 23. The lower layer may be comprised of any low heat loss material. In one embodiment of the present invention, the lower layer 29 is comprised of rubber or plastic material similar to the upper layer 23. If the lower layer is rubber, the lower layer 29 may be bonded to the fiber mat 25 by heat and pressure curing of the rubber.

Figure 2:
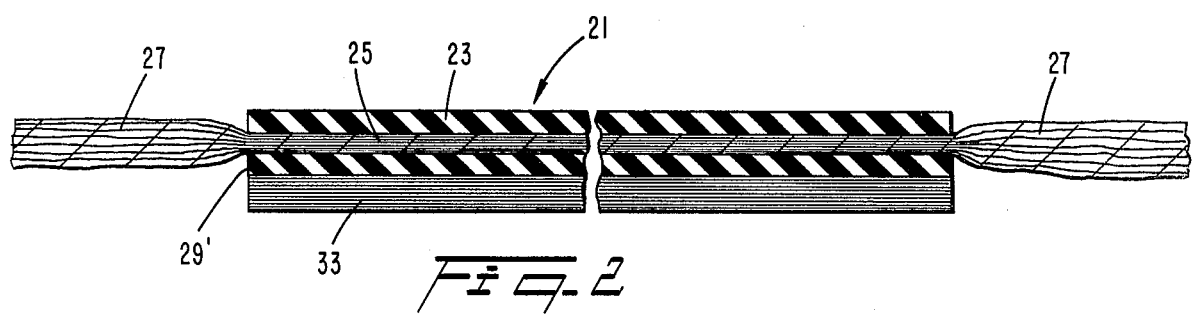
FIG. 2 is a longitudinal cross-sectional view of a second embodiment of a solar energy collecting panel according to the present invention.

With reference to FIG. 2, a second embodiment of the present invention includes a lower layer 29' comprised of aluminum or other heat reflective material. The heat reflective material serves to maintain heat within the fiber mat 25 and prevent loss of heat into the lower layer 29'. In addition, a layer of insulation 33 may be provided beneath the lower layer 29 or 29' to further prevent heat loss through the lower layer. The insulation 33 may be comprised of any suitable insulating material.

The fiber mat 25 is comprised of a suitable material which transports fluid along the multitude of filaments contained in the fiber mat 25 by the combined effects of surface tension and capillary action. In the preferred embodiment, the fiber mat 25 comprises a nonwoven, needle punched, fabric made of continuous filaments of polyester or polypropylene. The fabric is needle punched to mechanically entangle and/or bond the filaments and to provide integrity to the material. The needle punching produces a randomized orientation of the filaments and greatly increase access to the free surfaces of the fiber mat for the fluid traveling along the filaments. Fabrics of this type in one form are known as a geotextiles and are used in subsurface drainage generally as a filter or separator and not primarily for the fluid transport properties of the fabrics. Staple fibers may be used for the fiber mat but it has been found that a fiber mat of continuous filaments is more effective for transporting fluid along the filaments. Fabrics of this general type are manufactured, for example, by Monsanto under the name Bidim TM which is comprised of polyester fibers and by Crown Zellerback under the name Fibretex TM which is comprised of polypropylene fibers.

The nature of the filaments in the fiber mat ensures that the complete volume of the fabric of fiber mat 25 becomes wetted with fluid, preferably water. The randomized fabric filaments absorb and transport the fluid throughout the mat 25 and repeatedly toward and into intimate contact with the surface 31 of the upper layer 23 which, in the preferred embodiment, is bonded directly to the fiber mat 25. In this way, heat absorbed by the upper layer 23 is transferred to the fluid carried along the filaments of the fiber mat 25. In this regard, it should be noted that gravity is not the primary driving force of the fluid along the filaments. The fluid is transported primarily by capillary action and surface tension throughout the entire fiber mat 25. In other words, the fluid moves along the multitude of filaments such that substantially all the fluid eventually intimately and repeatedly contacts the surface 31 of the upper layer 23 to absorb heat therefrom.

In the illustrated embodiment, the fiber mat 25 has been slightly compressed between the upper and lower layers 23, 29. This compression is due in part to heat and pressure applied for curing the upper rubber layer 23 and the lower layer 29 during bonding of the layers to the fiber mat 25 in the preferred embodiment. While this compression may decrease the effectiveness of the fiber mat somewhat by reducing the free area within the mat for the transportation of water, the number and surface area of the filaments within the fiber mat 25 that intimately contact the surface 31 of the upper layer 23 are increased. In the preferred embodiment, due to the heat and pressure curing of the upper layer, some of the filaments within the fiber mat 25 may actually be embedded within the upper layer 23. The loss of free fluid flow within the fiber mat 25 is compensated for by a more effective transfer of heat from the surface 31 of the upper heat absorbing layer 23 to the fluid transported along the filaments of the fiber mat 25. In other words, by slightly compressing the fiber mat 25 between the layers, more filaments are in intimate contact with the surface 31 of the upper layer 23 to absorb heat.

The layer of insulation 33 (FIG. 2) may be comprised of the same material as the material of fiber mat 25. The nonwoven needle punched fabric preferred for the fiber mat 25 has approximately the same R value as polystyrene foam when the fabric is dry. However, as stated previously, any suitable insulation will function satisfactorily. In fact, the insulation layer is not essential for operation of the solar collecting panel 21 but is desirable for certain installations of the solar collecting panel when a loss of heat through the lower layer is expected to be greater, for example, when the panel is arranged to be relatively free standing.

With reference to FIG. 3, the upper layer 23 is preferably fluidically sealed, e.g., by bonding, to the lower layer 29 along the longitudinal edges 35 with the ends 27 of the fiber mat 25 extending beyond the ends of the upper and lower layers 23, 29. However, the sealing of the two layers 23, 29 along the longitudinal edges 35 is not essential. Due to the nature of the fiber mat 25, the fluid or water is held within the fabric by capillary action and surface tension instead of forming droplets which could drip from the longitudinal edges of the panel 21. However, by sealing the longitudinal edges 35 of the upper and lower layers 23, 29, heat loss along the edges of the fiber mat 25 is minimized and the loss of fluid along these edges is further ensured.

With reference to FIG. 4, the solar heat collecting panel 21 of the present invention is arranged in a solar collecting apparatus. An inlet header 37 for receiving fluid, preferably water, from a pump 39 through a pipe 41 is arranged at a first end of the panel 21. The panel 21 is inserted within a slot 43 arranged in a surface of the inlet header 37 such that the ends 27 of fiber mat 25 and the upper and lower layers extend into the inlet header 37. Each of the upper and lower layers 23, 29 of the panel 21 is sealed to the inlet header 37 about the opening 43 by a suitable bonding or sealing agent 45. A similar arrangement is provided at a second end of the panel 21 such that the panel 21 extends into an outlet header 47 through an opening 49 in the wall thereof and the upper and lower layers are bonded or sealed to the outlet header 47 along the opening 49 by appropriate seals 51.

In order to prevent fluid leakage, the ends of the inlet and outlet headers are preferably sealed in a suitable manner. The headers may be made from a suitable unbreakable lightweight plastic if desired. It should be noted, that since the ends 27 of the fiber mat 25 extend beyond the ends of the upper and lower layers 23, 29, the fiber mat 25 extends further into the inlet and outlet headers 37, 49. The end 27 of the fiber mat 25 within the inlet header 37 preferably extends sufficiently into the inlet header 37 to present a substantial surface area of the mat 25 adapted to be wetted by a pool of fluid 53 admitted to the inlet header 37 through the pipe 41 in order to initiate the transport of fluid throughout the mat. The nature of the fiber mat 25 is such that water is absorbed into the mat freely, somewhat like a sponge, to initiate transport of the fluid within the panel 21.

Fluid is transported from the inlet header 37 along the filaments of the fiber mat 25 by capillary action and surface tension both toward the upper layer surface 31 to be heated and toward the outlet header 47. Heated fluid 55 transported by the fiber mat 25 into the outlet header 47 is removed from the outlet header in a line 57. The line 57 enters a heat exchanger 59 of conventional design, to transfer heat from the heated fluid 55 to a working fluid contained within a heat exchanger tube 61. The heat exchanger tube 61 is arranged to contact the heated fluid 55 delivered from the outlet header 47. The tube 61 may be connected to a heat storage device or directly to an area to be heated. The cooled fluid or water 55 is then removed from the heat exchanger 59 by the pump 39 and returned to the inlet header 37 to be reheated by the solar collecting panel 21.

It should be noted that no valving is required in the line 41 which supplies the inlet header 37 with water. This is due to the nature of the fiber mat 25 which only absorbs sufficient water to keep the mat wetted. Further, although a substantial incline is illustrated in FIG. 4 for the panel 21, the substantial head created by such a large vertical drop is not required to force the fluid from the inlet header 37 to the outlet header 47. The capillary action and surface tension created within the filaments of the fiber mat 25 is sufficient to absorb and transport the fluid at a predetermined rate throughout the length of the panel 21. Further, the fluid is repeatedly transported by the various filaments into contact with the upper layer surface 31 to transfer heat contained within the upper layer 23 to the filaments of the fiber mat 25. In other words, once the fiber mat 25 has become completely wetted, the fabric filaments transport the fluid at a controlled rate from the inlet header 37 to the outlet header 47. It may be desirable, however, to provide a shutoff valve in the line 41 or on the pump 39 to stop the flow of fluid to the inlet header 37 when the weather is not conducive to heating the fluid.

The installation of the present invention is facilitated by the materials used in construction of the solar collecting panel 21. As stated above, a large vertical drop is not essential to the operation of the present invention. The solar collecting panel 21 of the present invention operates satisfactory with only a very small vertical drop. Accordingly, the panel 21 of the present invention can be installed in numerous locations including a relatively flat roof. It should be noted that if the fiber mat 25 is selected from an appropriate fabric, the present invention may function with no vertical drop at all depending solely upon the effects of capillary action and surface tension to move the fluid along the filaments of the fiber mat 25. However, a small vertical drop is desirable to further ensure fluid flow through the panel 21.

Due to the flexible nature of the upper and lower layers 23, 29 in the preferred embodiment of the present invention, the collector panel 21 can be secured to an uneven surface of a roof or other structure. Further, the panel 21 may be simply secured to the desired structure by nailing directly through the upper and lower layers 23, 29 and the fiber mat 25. Little or no fluid leakage will occur around these nail openings since the fluid is held on the filaments of the fiber mat by surface tension and capillary action. Further, the nature of the rubber or plastic material from which the upper and lower layers are preferably made, provides a sealing about the nail as it is driven through the layers. It should also be noted that due to the flexible, unbreakable nature of the panel 21 and the headers 37, 47 of the present invention, storage and handling cost are considerably decreased over that of the rigid box type collectors of the prior art.

In operation, water or cooled fluid from the heat exchanger 59, along with makeup water if necessary, is pumped by the pump 39 through the line 41 into the inlet header 37. The pool of fluid 53 within the inlet header 37 is gradually absorbed by the end 27 of the fiber mat 25. As the end 27 becomes thoroughly wetted, the fluid is transported by capillary action and surface tension along the filaments and proceeds toward the outlet header 47 between the upper and lower layers 23, 29 in a random fashion. As the fluid flows further through the mat 25 along the multitude of randomized filaments in a direction towards the outlet header 47, the fluid carried along various individual filaments periodically and repeatedly comes into intimate contact with the surface 31 of the upper layer 23 which has been heated by solar energy contacting the upper surface 24. In this way, substantially all of the fluid contacts the surface 31 of the upper layer 23 before reaching the outlet header 47. The upper layer 23 having absorbed heat from the sun, transfers the heat from the surface 31 to the fluid contained on the individual filaments of the fiber mat 25.

After traveling the length of the panel 21 between the upper and lower layers 23, 29, the fluid has absorbed a substantial quantity of heat. This heated fluid is deposited from the end 27 of the fiber mat 25 into the pool 55 of heated fluid within the outlet header 47. The heated fluid 55 is transported through the line 57 by gravity or a small pump (not shown) to the heat exchanger 59 where the heated fluid 55 exchanges heat with a working fluid contained within the heat exchanger tube 61 for use in space heating or other purposes. The cooled fluid is then transported into the inlet of the pump 39 in the line 63 to be returned to the inlet heater 37 for reheating within the panel 21.

As can be seen, the present invention provides an efficient apparatus for collecting heat from the sun. The apparatus of the present invention is both simple in construction and easy to install. The cost of the apparatus according present invention is low since no complex valving, rigid support structures, or expensive materials are required. The present invention relies upon the principles of capillary action and surface tension within the fiber mat 25 to transport the fluid repeatedly into intimate contact with the surface 31 of the heat collecting layer 23 to effectively and efficiently transfer heat to the fluid.

The principles, preferred embodiment and mode of operation of the present invention have been described in the foregoing specification. However the invention which is intended to be protected is not to be construed as limited to the particular embodiments disclosed. The embodiments are to be regarded as illustrated rather than restrictive. Variations and changes may be made by others without departing from the spirit of the present invention. Accordingly, it is expressly intended that all such variations and changes which fall within the spirit and scope of the present invention as defined in the appended claims be embraced thereby.

What is claimed is:

1. A solar energy collecting panel comprising:
    a first layer of heat absorbing material, said material being black and opaque;
    fiber means for repeatedly transporting a fluid toward a first surface of the first layer to transfer heat from the layer to the fluid, said fiber means being bonded to said first surface to ensure intimate contact between filaments of the fiber means and the first surface; and
    a second layer arranged such that the fiber means is confined between the first and second layers.

2. The solar panel of claim 1, wherein the fiber means comprises a nonwoven fabric.

3. The solar panel of claim 2, wherein the heat absorbing layer comprises a flexible film of rubber which is bonded directly to the fabric.

4. The solar panel of claim 3, wherein the second layer comprises a film of rubber bonded to the first layer along longitudinal edges of the first and second layers.

5. The solar panel of claim 4, wherein the fabric is slightly compressed between the first and second layers.

6. The solar panel of claim 1, wherein the fiber means comprises a nonwoven fabric of randomized fibers.

7. The solar panel of claim 1, wherein the fiber means comprises a nonwoven needle punched fabric of continuous filaments of polyester.

8. The solar panel of claim 1, wherein the second layer comprises a heat reflective material.

9. The solar panel of claim 1, wherein the first and second layers are joined together along longitudinal edges of the layers.

10. The solar panel of claim 1 or 9 wherein the fiber means extends beyond the first and second ends of both the first and second layers.

11. The solar panel of claim 1, further comprising insulation means arranged on a side of the second layer opposite the fiber means.

12. The solar panel of claim 1, wherein the fiber means comprises a nonwoven, needle punched fabric of continuous filaments of polypropylene.

13. The solar panel of claim 7 or 12, wherein the filaments are arranged to transport the fluid by both capillary action and surface tension to repeatedly intimately contact the first surface of the first layer.

14. A solar energy collecting apparatus comprising:
    a first layer of heat absorbing material;
    an inlet header and an outlet header;
    means for supplying a fluid to the inlet header and means for removing fluid from the outlet header;
    a first end of the first layer being fluidically sealed to the inlet header and a second end being fluidically sealed to said outlet header;
    fiber means both for repeatedly transporting the fluid toward a first surface of the first layer to transfer heat from the first layer to the fluid and for transporting the fluid from the inlet header to the outlet header;
    a second layer having a first end fluidically sealed to the inlet header and a second end fluidically sealed to the outlet header, said second layer being arranged such that the fiber means is confined between the first and second layers; and
    said fiber means being arranged to intimately contact the first surface and having first and second ends extending beyond the first and second ends of both the first and second layers into the inlet header and the outlet header respectively.

15. The apparatus of claim 14, wherein the fiber means comprises a nonwoven fabric of randomized fibers.

16. The apparatus of claim 14, wherein longitudinal edges of the first and second layers are joined together.

17. The apparatus of claim 14, wherein the fiber means comprises a nonwoven, needle punched fabric of continuous filaments of polyester or polypropylene.

* * * * *